(12) United States Patent
Kobayashi et al.

(10) Patent No.: US 12,021,249 B2
(45) Date of Patent: Jun. 25, 2024

(54) BATTERY CASE

(71) Applicant: NIPPON STEEL CORPORATION, Tokyo (JP)

(72) Inventors: Akinobu Kobayashi, Tokyo (JP); Takehiro Takahashi, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/031,326

(22) PCT Filed: Oct. 4, 2021

(86) PCT No.: PCT/JP2021/036670
§ 371 (c)(1),
(2) Date: Apr. 11, 2023

(87) PCT Pub. No.: WO2022/085412
PCT Pub. Date: Apr. 28, 2022

(65) Prior Publication Data
US 2023/0275292 A1    Aug. 31, 2023

(30) Foreign Application Priority Data
Oct. 21, 2020    (JP) ................. 2020-176690

(51) Int. Cl.
*H01M 50/00*    (2021.01)
*H01M 50/119*    (2021.01)
(Continued)

(52) U.S. Cl.
CPC ....... *H01M 50/119* (2021.01); *H01M 50/124* (2021.01); *H01M 50/133* (2021.01); *H01M 50/159* (2021.01); *H01M 50/169* (2021.01)

(58) Field of Classification Search
CPC ............. H01M 50/564; H01M 50/553; H01M 50/555; H01M 50/103; H01M 50/117
See application file for complete search history.

(56) References Cited

U.S. PATENT DOCUMENTS

| 2012/0009464 A1 | 1/2012 | Nakazawa et al. |
| 2016/0043356 A1 | 2/2016 | Sunada et al. |

FOREIGN PATENT DOCUMENTS

| JP | 63-239764 A | 10/1988 |
| JP | 2001-233334 A | 8/2001 |

(Continued)

OTHER PUBLICATIONS

Nakamura et al., Electrochemical Cell, Dec. 2004. (Year: 2004).*

*Primary Examiner* — Cynthia H Kelly
*Assistant Examiner* — Monique M Wills
(74) *Attorney, Agent, or Firm* — Birch, Stewart, Kolasch & Birch, LLP (57) ABSTRACT

A novel battery container that can be obtained by welding plated steel sheets, has sufficient sealing ability over a long period of time, and is able to keep the base material of the plated steel sheets from being exposed and eluting into the electrolyte solution is provided. That is, a battery case comprised of a container body and a container lid, wherein the container body and the container lid are each comprised of a plated steel sheet, a joint part between the container and the container lid is comprised of a plating welded part containing a main constituent component of the plating of the plated steel sheet in 60 mass % or more and a steel sheet welded part containing the main constituent component of the plating in less than 60 mass %, and the plating welded part has a length of 0.5 μm or more and less than 1.0 mm in a joint longitudinal direction.

20 Claims, 3 Drawing Sheets

(51) Int. Cl.
  *H01M 50/124* (2021.01)
  *H01M 50/133* (2021.01)
  *H01M 50/159* (2021.01)
  *H01M 50/169* (2021.01)

(56) References Cited

FOREIGN PATENT DOCUMENTS

| | | | | |
|---|---|---|---|---|
| JP | 2004356009 A | * | 12/2004 | .......... H01M 2/0207 |
| JP | 2005-40853 A | | 2/2005 | |
| JP | 2011-9154 A | | 1/2011 | |
| JP | 2011-60644 A | | 3/2011 | |
| JP | 2016-38991 A | | 3/2016 | |
| KR | 10-2011-0131250 A | | 12/2011 | |

\* cited by examiner

BATTERY CASE

FIELD

The present invention relates to a battery case comprised of a container body and a container lid, more particularly a battery case wherein the container body and the container lid are comprised of plated steel sheets, a joint part between the container and the container lid is comprised of a plating welded part and a steel sheet welded part, and the plating welded part has a length of the plating thickness of the plated steel sheet or more.

BACKGROUND

As cases for electricity storing elements such as storage batteries and capacitors, two types are broadly known: ones of types that mainly use metal sheet members and form cylindrical shaped or prismatic cans by pressing, seaming, laser welding, etc. and ones of pouch types that use plastic films having metal foils as gas barrier layers and form cases by heat sealing to obtain heat-sealed parts (in this case, the cases are soft, so are also called "bag members").

A pouch type battery is used in a state isolating the electricity storing element part from the outer environment by wrapping it in a metal foil laminated with a heat-seal resin (laminated metal foil) and heat sealing parts of the heat-seal resin to form a heat sealed part. This is because leaking of the battery electrolyte to the outside or entry of water vapor from the environment would be catastrophic to battery life.

However, with a heat-sealed part, sometimes the sealing ability will be insufficient and water vapor in the atmosphere will enter the inside of the battery and cause the battery to deteriorate. In other words, with only a heat-sealed part, performance will sometimes more easily degrade along with long-term use.

As opposed to this, as explained above, containers formed by pressing, seaming, laser welding, etc. metal sheet members such as steel sheets are also known. In this case, since these containers employ metal sheet members, they are superior to pouches using aluminum or other metal foil in high temperature strength, puncture strength, and ability to reduce thickness. However, if a metal sheet member (iron etc.) is exposed inside the container, the metal (iron etc.) will elute into the electrolyte and become a cause of deterioration of battery performance.

Therefore, sometimes plated steel sheet is used so that the metal sheet member (iron etc.) does not directly contact the electrolyte.

For example, PTL 1 discloses a battery container formed from a sheet member comprising a steel sheet and a metal plating layer covering the sides of the same (in other words, plated steel sheet). In PTL 1, there is no heat sealing of plastic, and the hermeticity of the container is achieved by crimping the sheet member.

Further, sometimes a plated steel sheet is welded to form a container. However, since metal would be exposed at the welded location, the exposed metal portion is protected by being covered by plastic etc.

For example, PTL 2 discloses a can body and a fabrication method therefor in which a plated steel sheet is fabricated into a cylindrical container (can body) by lap welding, a level difference remains at the lap welded location due to the overlap, but a resin is applied in close contact with no gaps even at locations with such level differences. Specifically, it proposes to combine resins with different melting point temperatures to apply a heat seal at a suitable temperature.

Batteries are being required to be further improved in durability, made longer in life, made lower in costs, etc. To realize this, various research and development continue to be undertaken for battery containers.

Citation List

PTL

[PTL 1] Japanese Unexamined Patent Publication No. 2011-060644
[PTL 2] Japanese Unexamined Patent Publication No. 2001-233334

SUMMARY

Technical Problem

As explained above, various battery containers have been studied, and many points needing further improvement have also been found.

For example, in the pouch type using laminated metal foil, due to being a foil, sometimes sufficient strength cannot be achieved and sometimes sufficient sealing ability cannot be achieved with heat sealing of the laminate.

Further, if, like in PTL 1, working plated steel sheet by crimping, seaming, or other non-welding means, the battery will expand and shrink repeatedly during charging and discharging resulting in loosening at the crimping and seaming locations over a long period of time and preventing sufficient sealing ability from being achieved.

Further, if, like in PTL 2, the plated steel sheet is welded, the plating will end up being burned off at the welded locations resulting in the problem of the metal being exposed and requiring additional steps such as covering the exposed locations by a resin for protecting them.

In consideration of the above, the present invention has as its object the provision of a novel battery container obtained by welding plated steel sheet in which battery container it is possible to keep the base metal of the plated steel sheet from being exposed and eluting into the electrolyte.

Solution to Problem

The present inventors engaged in intensive study and obtained the following findings thereby completing the invention of the present application.

If welding plated steel sheet together, normally, the plating at the welded part and its vicinity is burned off resulting in the metal of the steel sheet base material being exposed. However, the present inventors discovered that by appropriately combining conditions of the welding method, cooling jig, etc., it is possible to obtain a novel battery container in which at the welded end locations, the steel sheet can be welded together and sufficient sealing ability can be achieved and in which at the locations adjacent to the same, the plating can be welded together and the metal of the steel sheet base material can be sufficiently kept from being exposed to the electrolyte and eluting into the same.

In particular, the inventors found that it is useful to select materials based on the relationship between the melting points of the main constituent component of the plating and the metal of the steel sheet base material.

The present inventors completed the invention of the present application based on the above-mentioned findings. Due to the present invention, the following are provided.

[1] A battery case comprising a container body and a container lid, in which battery case, the container body and the container lid are each comprised of a plated steel sheet, a joint part between the container body and the container lid is comprised of a plating welded part containing a main constituent component of the plating of the plated steel sheet in 60 mass % or more and a steel sheet welded part containing the main constituent component of the plating in less than 60 mass %, and the plating welded part has a length of 0.5 μm or more a less than 1.00 mm in a joint longitudinal direction.

[2] The battery case according to [1], wherein a boiling point of the main constituent component of the plating is the melting point of the base material of the plated steel sheet or more and a melting point of the main constituent component of the plating is the melting point of the base material or less.

[3] The battery case according to [1] or [2], wherein the plated steel sheet has a sheet thickness of 0.1 or more and 1.0 mm or less.

[4] The battery case according to any one of [1] to [3], wherein the plated steel sheet has a plating thickness of 0.5 or more and 15.0 μm or less.

[5] The battery case according to any one of [1] to [4], wherein a concentration of the main constituent component of the plating is higher at the center of the plating welded part than at the plating surface of the plated steel sheet.

[6] The battery case according to any one of [1] to [5], wherein the base material of the plated steel sheet is steel sheet, and the main constituent component of the plating includes one or more of Ni, Al, Sn, and Cr.

[7] The battery case according to any one of [1] to [6], wherein, in a cross-section of the plated steel sheet in a sheet thickness direction, the plating welded part has a shape in which a ratio between the distance from a weld center line to a boundary of the plating welded part in a vertically upward direction and the distance from the weld center line to a boundary of the plating welded part in a vertically downward direction is within 0.5 to 2.0.

Advantageous Effects of Invention

According to one embodiment of the present invention, a novel battery container is provided in which the base metal of the plated steel sheet can be kept from being exposed and eluting into the electrolyte. Further, since the battery container is sealed by a welded part, the battery container is provided with excellent sealing ability over a long period of time compared to sealing by crimping or seaming or to heat sealing in pouch types.

DESCRIPTION OF EMBODIMENTS

The battery case according to one embodiment of the present invention is comprised of a container body and a container lid, in which battery case,
the container body and the container lid are each comprised of a plated steel sheet,
a joint part between the container body and the container lid is comprised of a plating welded part containing a main constituent component of the plating of the plated steel sheet in 60 mass % or more and a steel sheet welded part containing the main constituent component of the plating in less than 60 mass %, and the plating welded part has a length of 0.5 μm to less than 1.00 mm in a joint longitudinal direction.

The battery case according to the present embodiment is comprised of a container body and a container lid. The container body and the container lid are each comprised of a plated steel sheet.

Further, the container body and the container lid are joined by welding. The joint part is comprised of a steel sheet welded part at which the steel sheets constituting the base materials of the plated steel sheets are welded together and a plating welded part at which the plating parts of the plated steel sheets are welded together.

Such weld joint parts can be obtained by appropriately combining the conditions of the welding method, cooling jig, etc.

As one means, it is possible to obtain a weld joint part by superposing the plated steel sheets of the container body and the container lid and irradiating a laser beam etc. at the superposed end parts of the plated steel sheets for edge joint welding. In edge joint welding, the plating faces of the plated steel sheets are made to contact each other and the ends of the plated steel sheets are aligned and superposed, a laser beam etc. is irradiated at the ends of the plated steel sheets, the plated steel sheets are heated from the end parts, and heat input from the laser beam etc. is transmitted from the end parts to the distal parts. For this reason, the end parts become the highest in temperature, the plating parts are burned off, the steel sheets constituting the base materials are welded together, and a steel sheet welded part is formed. Locations far from the steel sheet welded part never become higher in temperature than the steel sheet welded part (temperatures fall from steel sheet welded part), so the plating is not burned off, the plating parts are welded together, and the plated welded part is formed. Locations far from the plated welded part further fall in temperature, so the plating parts are not welded together either and the original plating parts of the plated steel sheets are maintained as they are. The steel sheet welded part and plating welded part can be obtained in the single step of edge joint welding. This is preferable in the additional point that it is possible to reduce production costs in comparison to applying a resin coating after conventional welding or performing welding after heat sealing a resin part.

Further, welding occurs due to heating. The heat source is not particularly limited. A laser beam, electron beam, electric resistance heating (seam welding), etc. can be used. The input energy, scanning speed, etc., can be suitably adjusted according to the materials to be joined.

The laser welding method may be a known method. For example, a carbon dioxide gas laser, semiconductor laser, etc. may be used as a beam source. Further, laser light passing through a fiber, laser light focused by a lens, or laser light reflected by a reflective mirror may be used. The irradiation conditions of the welding laser can be suitably adjusted according to the object being welded etc. When using a 1000 W class semiconductor laser, the welding conditions may be made the following ranges.

Wavelength: 800 to 1200 nm
Focus spot size: 0.3 to 1.8 mm
Assist gas: Ar 10 to 50 L/min, φ4 to 12 mm
Laser scanning speed: 3 to 100 mm/sec
Laser output: 100 to 2000 W Further, in the case of electric resistance heating, the welding may be seam welding in which clamping electrodes take the form of rotating discs. The seam welding conditions can be suitably adjusted according to the object being welded etc. Welding conditions in the following ranges may be used.

Welding speed: 1 to 80 m/min
Applied pressure: 0.5 to 100 (N)
Welding current: 3 to 5 kA
Current frequency: 200 to 1500 Hz Note that at the time of welding, a jig is used to control the temperatures or input heat of different locations. More specifically, a jig for controlling temperature by heat absorption is disposed at a location corresponding to the plating welded part. The jig may be water cooled on the inside for rapid cooling. The size or length of such a jig can be suitably adjusted to adjust the temperature control range. By doing so, the length of the plating welded part can also be adjusted. Further, jigs of different thermal conductivities such as those made from Cu, Al, Fe, etc. may be used for the jig. The jig may also be a partial combination of these.

Further, when welding the container lid and the container body, the shape precision sometimes may not be very good. In such cases, if welding with a method like laser welding in which the steel sheets are not clamped, even if the end face sides of the steel sheets can be welded (even if the steel sheet welded part can be formed), there may possibly be not enough contact at the location corresponding to the plating welded part resulting in the plating welded part to not be formed to a sufficient length. By clamping the container lid and container body in a predetermined range using the jig, it is possible to stably form the plating welded part to a sufficient length.

A water-cooling mechanism may be provided inside or outside of the jig, or the jig may be kept while cooled in a separate step.

More specifically, the jig conditions may be adjusted in the following manner.

The range of cooling by the jig (corresponding to the welded part length) may be 2 mm or more, more preferably 5 mm or more. A jig has a larger heat capacity the greater the volume, so the cooling ability of the plated steel sheet can be increased.

From the viewpoint of anchoring, by pressing the container lid and container body against each other with the jig, the plating welded part can be formed stably at the time of welding. For this reason, the jig preferably is pressed over a range of the length of the welded part or more.

The jig may have a mechanism for circulating a refrigerant inside it to keep the temperature of the jig from becoming high. Due to this, the cooling performance of the jig becomes excellent.

The jig may be kept at 100° C. or less in a pre-welding state. This enables variation in cooling effect caused by variation in the jig temperature to be suppressed.

As one means, it is possible to obtain a weld joint part by superposing the plated steel sheets of the container body and the container lid and irradiating a laser beam etc. at the surface of the superposed plated steel sheets for lap welding. In lap welding, the plating faces of the plated steel sheets are made to contact each other while the plated steel sheets are superposed, a laser beam etc. is irradiated at least at one of the outer surfaces of the plated steel sheets (the surfaces at which the plated steel sheets do not contact each other), the plated steel sheets are heated from the surface, and the heat input from the laser beam etc. is transmitted in the sheet thickness direction of the plated steel sheets from the surface of the plated steel sheets and is also transmitted in the planar direction at the same time. Generally, the outer surface becomes the highest in temperature. The temperature becomes lower the further from the outer surface in the sheet thickness direction of the plated steel sheets. Further, the temperature also becomes lower the further from the point at which the laser beam etc. is irradiated in the planar direction of the steel sheets. In other words, input heat is generally transmitted in a radiating shape from the location of irradiated upon by laser beam etc. For this reason, the temperature differs depending on the location. At a certain location, the temperature at which the steel sheets constituting the base material are welded to each other will be reached, and the steel sheets constituting the base material will be welded to each other at that location. Further, at another location, the temperature at which the plating parts are welded to each other will be reached, and the plating parts there will be welded to each other. Further, at still another location, the temperature at which the steel sheet base materials and the plating parts are welded will not be reached. There, the plated steel sheets will be maintained as they are. The steel sheet welded part and the plating welded part can be obtained in a single step of lap welding. This is preferable on the point of being able to reduce production costs in comparison to having to apply a resin coating additionally after conventional welding or performing welding after heat sealing a resin part.

Note that, in lap welding as well, the heat source is not particularly limited. A laser beam, electron beam, electric resistance heating, etc. can be used. Further, at the time of lap welding as well, a jig is used to control the temperatures or input heat at different locations. Further, not limited to the time of lap welding, the irradiating angle of the laser beam etc. may be adjusted to control the temperatures or input heat at different locations. If irradiating a laser beam etc. from a direction perpendicular to the plated steel sheets (outer surface), generally the input heat energy diffuses substantially uniformly in the planar direction of the steel sheets. By irradiating a laser beam etc. at an incline to the plated steel sheets (outer surface), the distribution of the input heat energy can be changed in the planar direction of the steel sheets. In other words, adjustment of the irradiating angle of the laser beam etc. may be considered one means for controlling the temperatures or input heat at different locations.

At the welded end location (steel sheet welded part), the steel sheets are welded together and sufficient sealing ability can be obtained. This is because steel sheet has a greater thickness (sheet thickness) than metal foil, therefore the welded part also has high strength. In a battery, the insides of the battery expand and contract at the time of charging and discharging. During repeated charging and discharging, with a welded part of resin laminate foil (due to foil being welded, the strength is not sufficient, so), breakage easily occurs. Even with working such as crimping or seaming, loosening will sometimes occur (curl back etc.), but with a welded part of the steel sheets, the strength is high and breakage will hardly ever occur. That is, sealing ability can be maintained over a long period of time. Further, at a welded portion, a gas barrier is formed by the metal, so at the steel sheet welded part, compared to a so-called heat-sealed part where the laminated resin is melted, entry of water vapor from the outside and leakage of electrolyte to the outside can be reduced to a negligible extent. This enables a great extension of the lifespan.

Further, at the locations adjacent to the steel sheet welded part (the plating welded part), the plating parts are welded to each other. This plays an extremely important role in a battery container. That is to say, at the steel sheet welded part, the plating is burned off. The base materials of the welded steel sheets are exposed. Iron, the main element of the steel sheet base materials, generally undergoes a chemical reaction if contacting the electrolyte of a battery and is liable to elute into the electrolyte. In addition, if iron elutes into the electrolyte, the performance of the battery is liable to be affected. However, in the present embodiment, a plating welded part is present at the locations adjacent to the steel sheet welded part. This prevents contact between the electrolyte inside the battery and the steel sheet welded part and can sufficiently keep the iron of the steel sheet base material from being exposed to the electrolyte and eluting. In turn, the battery performance can be kept from deteriorating.

Note that, at locations further from the plating welded part (from part at which laser beam etc. is irradiated), in other words, at the side further to the inside of the battery, the plating of the plated steel sheet is maintained as is. For this reason, even if there is contact with the electrolyte, the steel sheet constituting the base material is protected by the plating, and the iron constituting the main element of the base material will not elute into the electrolyte.

Here, the steel sheet welded part and the plating welded part will be prescribed more quantitatively as follows. A "plating welded part" is a location containing the main constituent component of the plating of the plated steel sheets in 60 mass % or more, and a "steel sheet welded part" is a location containing the main constituent component of the plating of the plated steel sheets in less than 60 mass %. Here, the "main constituent component of the plating" refers to the main component elements contained in the plating and excludes the impurities of S (sulfur) etc. For example, if the plating was a general nickel plating, the main constituent component would be comprised of nickel, and if a chrome-nickel plating, the main constituent component would be comprised of chrome and nickel.

Note that quantitatively, the "main constituent component" may also mean the component accounting for 80 mass % or more of the plating composition, preferably 90% or more, more preferably 95% or more. If there are multiple elements in the main constituent component, for example, if a chrome-nickel plating, it is sufficient that the total component ratio of chrome and nickel be within the above-mentioned range.

If the plating welded part contains the main constituent component of the plating in 60 mass % or more, a chemical reaction between the electrolyte and the steel sheet base material can be prevented and the iron in the base material can be sufficiently kept from being exposed to and eluting into the electrolyte. If the plating welded part contains the main constituent component of the plating in less than 60 mass %, iron and other metals included in the steel sheet base material can be present in an amount of 40 mass % or more. In this case, the plating welded part will easily react with the electrolyte solution and iron and other metals will easily dissolve in the electrolyte solution resulting in progressive deterioration of battery performance.

Figure 1:
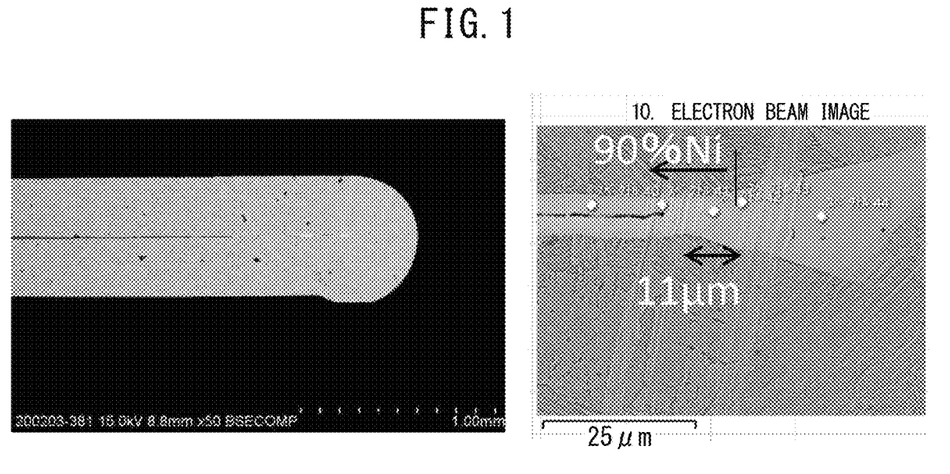
FIG. 1 is a photograph showing one example of a joint part and its expanded view.
Figure 2:
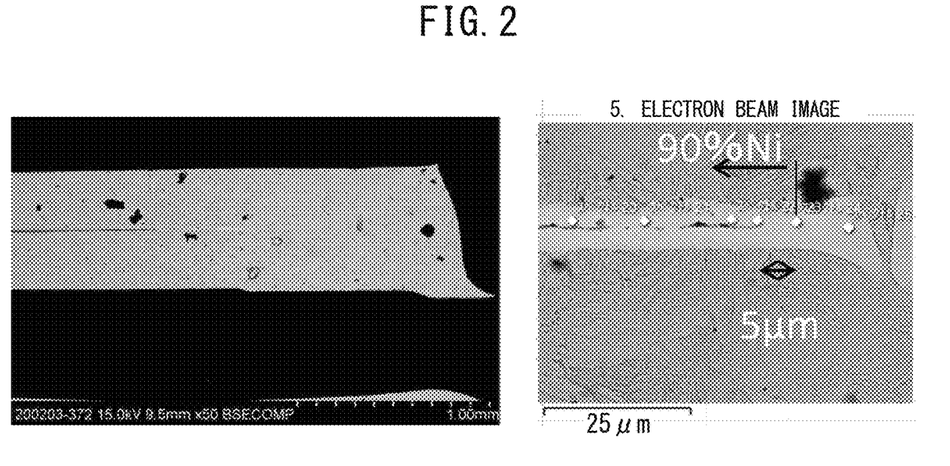
FIG. 2 is a photograph showing one example of a joint part and its expanded view.
Figure 3:
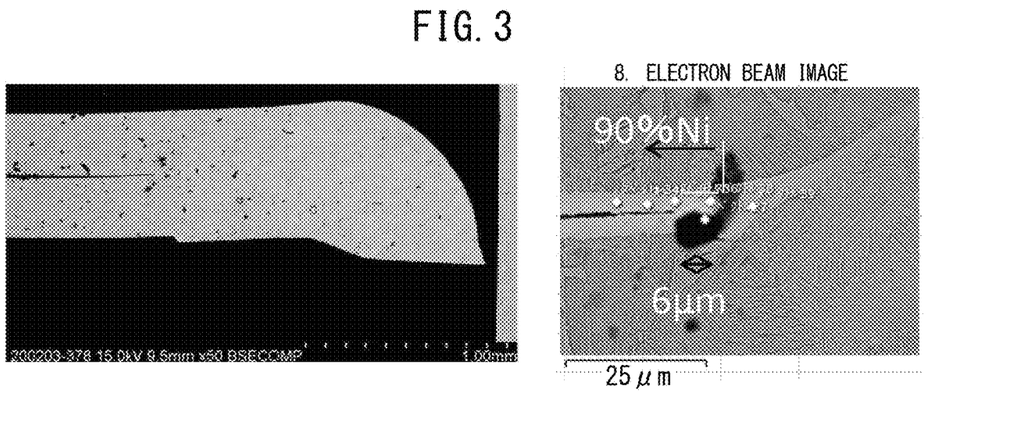
FIG. 3 is a photograph showing one example of a joint part and its expanded view.
Figure 4:
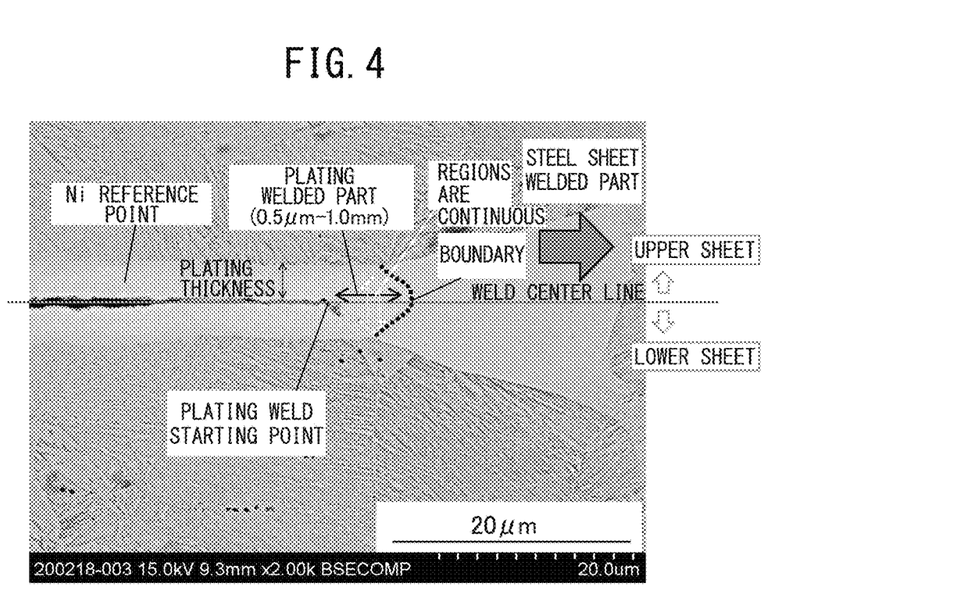
FIG. 4 is a schematic view showing one example of a joint part for explaining different parts of a joint part.
Figure 5:
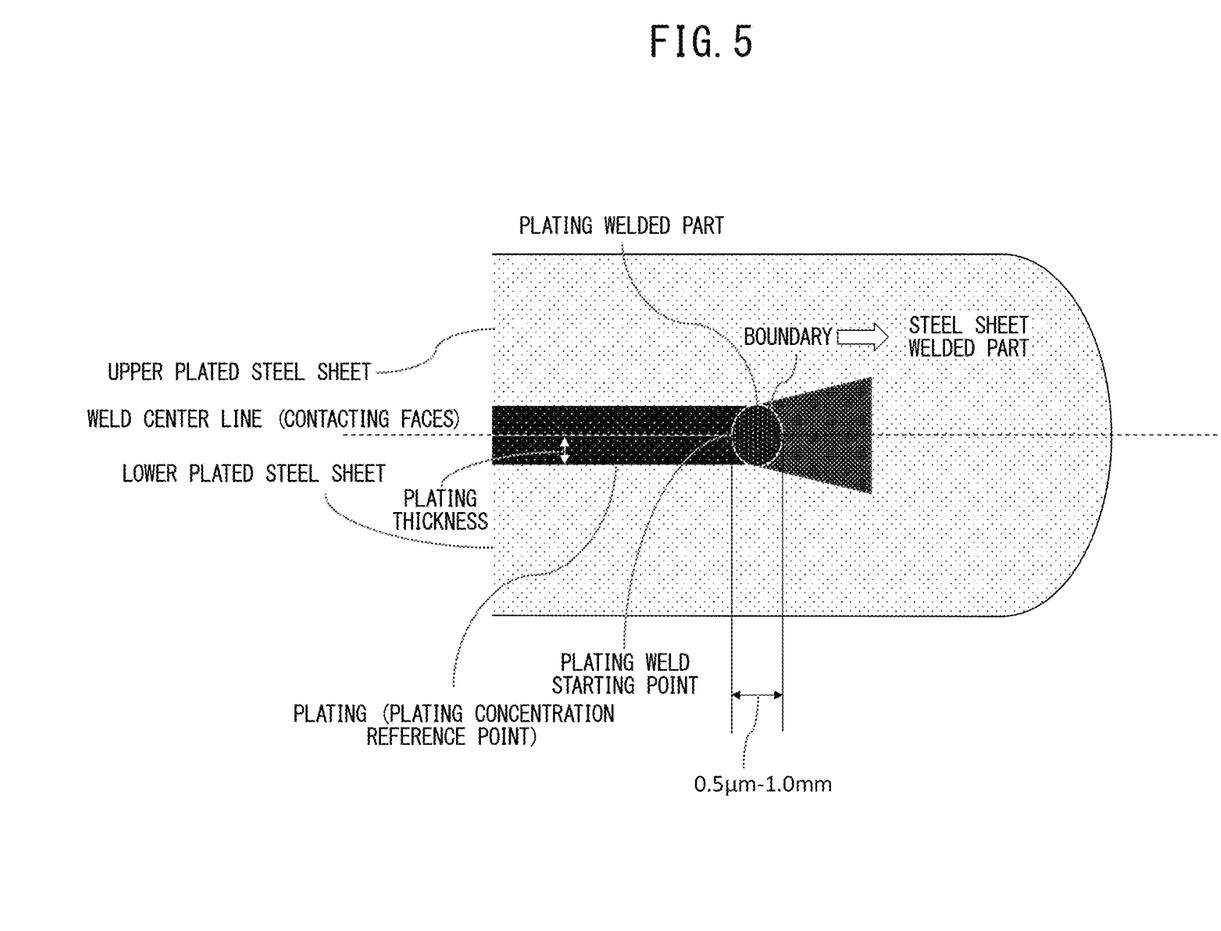
FIG. 5 is a schematic view showing one example of a joint part for explaining different parts of a joint part.

FIG. 4 is a photograph explaining one example of a joint part including a steel sheet welded part and a plating welded part, and FIG. 5 is a schematic view of the same. Referring to these drawings, on the left side of the drawings, between the two plated steel sheets vertically superposed, a gap remaining without being welded can be observed. (The straight line running along this gap will sometimes be called a "weld center line" for convenience.) Proceeding in the right direction along the gap (weld center line), there is an end point of the gap (in the drawings, indicated as the "plating weld starting point"). This is one end of the plating welded part. At a point further proceeding in the right direction along the weld center line by exactly a distance the same as the plating thickness of plated steel sheets, the plating parts of the two plated steel sheets vertically superposed are welded together. The range over which locations containing the main constituent component of the plating of the plated steel sheets in 60 mass % or more can be confirmed to be continuously connected is the plating welded part. "Continuously connected locations", to put it another way, are locations in which the above-explained gap cannot be observed and in which the main constituent component of the plating is not less than 60 mass %. At a point even further proceeding in the right direction along the weld center line, there is a transition to a steel sheet welded part at which the steel sheet base materials of the plated steel sheets are welded to each other, so the concentration of the main constituent component of the plating decreases. Regarding this, the boundary between the plating welded part and the steel sheet welded part is judged by whether the main constituent component of the plating of the plated steel sheets is 60 mass % or more or is less. In other words, if 60 mass % or more, it is a plating welded part, and if less than 60 mass %, it is a steel sheet welded part.

Incidentally, a plating welded part generally has a concentration of the main constituent component of the plating that becomes higher toward the plating weld starting point (the left direction in the drawings). Accordingly, the plating welded part may be the range in which the main constituent component of the plating is 80 mass % or more. The length in the lateral direction (welding direction) may be about 50% or more of the plating welded part, preferably may be 80% or more. The higher the concentration of the main constituent component of the plating, the more difficult it will be for a reaction to occur between the plating welded part and the electrolyte and the more difficult it will be for iron and other metals to elute into the electrolyte solution. Further, the plating welded part has a high concentration of the main constituent component of the plating. The longer it is, the higher the functionality of protecting the steel sheet welded part (it becomes difficult for iron and other metals to elute into the electrolyte solution). As a result, it is possible to keep the battery performance from deteriorating.

Further, the steel sheet welded part also may contain the main constituent component of the plating. Provided, however, that, as mentioned above, the steel sheet welded part contains the main constituent component of the plating in less than 60 mass %. This means that it contains the iron and other metals included in the steel sheet base materials in 40 mass % or more. By this steel sheet welded part, sufficient sealing ability is achieved.

Note that the above-mentioned observation and measurement of element concentration are performed by SEM-EDS (Energy Dispersive X-ray Spectroscopy). An SEM captures an image by a power of 1000 to 3000 times magnification in accordance with the measured subject in the Backscattered Electron Imaging (BSE) mode. EDS uses a 1 μm diameter beam. The measurement intervals are 2 μm or less. The measured elements are Fe and the plating elements (Ni, Sn, Cr, Al, Si, etc.)

Further, the plating welded part has a length of 0.5 μm or more and less than 1.0 mm in a joint longitudinal direction. If the plating welded part is less than 0.5 μm, a chemical reaction between the electrolyte solution and steel sheet base materials cannot be sufficiently prevented, and the iron in the base materials is liable to be exposed and elute into the electrolyte. From the viewpoint of preventing the iron of the base materials from eluting, the longer the plating welded part, the more preferable. Provided, however, even if making the plating welded part excessively long, the effect of prevention of eluting becomes saturated, so the upper limit is made less than 1.0 mm.

Further, if the plating welded part becomes longer than 1.0 mm, the overall welded part will become long and the material costs for the battery case will increase, the internal volume of the battery case will become smaller, modularization will be obstructed, and other demerits are liable to occur. Note that the content of the main constituent component of the plating in the plating welded part and the length of the plating welded part are measured by EDS analysis and electron microscopy, as explained earlier. Further, the "joint longitudinal direction" may be the direction from the welding starting point of the plating welded part to an end part of the steel sheet welded part (end part of the plated steel sheets) and may be a direction along the weld center line.

In one embodiment of the present invention, the boiling point of the main constituent component of the plating may be the melting point of the base metal of the plated steel sheet or more and the melting point of the main constituent component of the plating may be the melting point of the base materials or less.

As explained above, the steel sheet welded part and the plating welded part can be obtained by suitably combining conditions of the welding method, cooling jig, etc.

In welding, the temperature is highest at the location at which the laser beam etc. is irradiated. The temperature decreases the further from that location. Here, according to the present embodiment, the boiling point of the main constituent component of the plating is the melting point or more of the base material of the plated steel sheets, while the melting point of the main constituent component of the plating is the melting point of the base material or less. Accordingly, at a certain location, when the temperature rises and reaches the melting point or more of the base materials of the steel sheets, only naturally the base materials will be in states where they melt and can be welded together, but in the main constituent component of the plating, its melting point will be exceeded, but not the boiling point. Therefore, the main constituent component of the plating will not vaporize and impede welding of the base materials and a sound steel sheet welded part can be obtained. Further, at locations adjacent to the steel sheet welded part (in other words, far from the location at which the laser beam was irradiated), the temperature drops. When reaching the melting point of the base materials of the steel sheets or less, only naturally the base materials will not melt and will not be welded, but the main constituent component of the plating will sometimes exceed its melting point. In this case, the base materials will not be welded: only the main constituent component of the plating will be in a state in which it is melted and can be welded. It is possible to easily obtain a weld location constituted by the main constituent component of the plating, in order words, the plating welded part.

In one embodiment of the present invention, the plated steel sheet may have a sheet thickness of 0.1 mm or more and 1.0 mm or less.

If the plated steel sheet is thin, the amount of metal for forming the weld metal sometimes becomes insufficient, weld defects easily occur or metal deformation also easily occurs and control of the welding becomes difficult. On the other hand, if too thick, the weight of the container will increase, so this is sometimes disadvantageous from the viewpoint of weight reduction. Considering this, the plated steel sheet may have a sheet thickness of 0.1 mm or more and 1.0 mm or less. Preferably, the plated steel sheet may have a sheet thickness of 0.2 mm or more and 0.6 mm or less.

Note that the plated steel sheet may also be one which changes in its sheet thickness at least in part. As one example, even if the starting steel sheet thickness is constant, the sheet thickness may be changed at flanges, vertical walls, and the bottom by drawing operations etc.

Further, by making the plated steel sheet thinner at the location corresponding to the steel sheet welded part, welding can be quickly performed. Further, by making the sheet thickness of the steel sheet relatively thinner at a location corresponding to the plating welded part, heat transmittance to the plating can be promoted and welding of the plating can be promoted.

In one embodiment of the present invention, the plated steel sheet may have a plating thickness of 0.5 μm or more and 15.0 μm or less.

If the plating thickness is thin, the plating which will melt at the time of welding could sometimes be reduced too much causing defects to start appearing at the plating welded part (the plating being absent and the base material becoming exposed to the electrolyte solution and eluting). On the other hand, if too thick, not only the steel sheet base material but also a large amount of plating elements could melt at the time of welding of the steel sheet welded part and it some cases the steel sheet base material which should be welded will become difficult to be welded. Considering these, the plated steel sheet may have a plating thickness of 0.5 μm or more and 15.0 μm or less. Preferably, the plated steel sheet may have a plating thickness of 1.5 μm or more and 3.5 μm or less.

In one embodiment of the present invention, the concentration of the main constituent component of the plating may be higher at the center of the plating welded part (the center of the joint in the thickness direction and the width direction) than at the plating surface of the plated steel sheet (provided, however, other than heat affected zone due to welding). The present embodiment can be obtained by performing welding while sandwiching foil formed from the main constituent element of the plating between the plated steel sheets to be welded. Generally, in the plating of the plated steel sheet, the concentration of the elements of the main constituent component of the plating becomes less than 100 mass % due to alloying of the base material steel sheet and the plating. On the other hand, the foil between the plated steel sheets to be welded is formed from the main constituent elements of the plating and is not alloyed with the base material steel sheets, so the concentration of the main constituent elements will sometimes become higher than at the plating surfaces of the plated steel sheets. Accordingly, by performing welding while sandwiching this foil between the steel sheets, the concentration of the elements of the main constituent component of the plating will sometimes become higher at the center of the plating welded part (the center of the joint in the thickness direction and the width direction) at the plating surfaces of the plated steel sheets (provided, however, other than heat affected zone due to welding). By the concentration of the elements of the plating main constituent component becoming higher, the corrosion resistance of the plating welded part is increased so this is preferable. Note that the plating welded part formed when welding sandwiching a foil can be observed by a technique using the SEM-EDS explained above. Specifically, the interfaces between the plating parts of the two steel sheets vertically superposed and the foil sandwiched between them melt. The point at which these interfaces cannot be differentiated (identified) when viewing the image is deemed the starting point (one end) of the plating welded part. The boundary between the plating welded part and the steel sheet welded part can be similarly differentiated (identified) by the above-explained technique using SEM-EDS.

In one embodiment of the present invention, the base material of the plated steel sheet is a steel sheet, and the main constituent component of the plating may include one or more of Ni, Al, Sn, and Cr.

The steel sheet constituting the base material used in the plated steel sheet may be suitably selected in the range in which no problems are caused in the plating properties and weldability. The type of steel sheet may be selected according to the electrolyte of the battery, the use environment, etc. so that suitable corrosion resistance can be achieved. Corrosion resistance and container strength can also be secured through the sheet thickness of the steel sheet, so steel sheet with good cost performance may be employed. As the material of the steel sheet, besides stainless steel, pure iron, carbon steel, low alloy steel, etc. may be employed.

The main constituent component of the plating used in the plated steel sheet may be suitably selected in the range in which welding of the plated steel sheet is not affected. The type of plating may be selected according to the electrolyte of the battery, the use environment, etc. so that suitable corrosion resistance can be achieved. The plating used in the plated steel sheet may include one or more of elements among Ni, Al, Sn, and Cr. Plating including these elements can be obtained through ordinary methods. In a plating including a plurality of elements, the plating elements may be plated in one or more states among an alloyed layer state, a lamellar state, and a part granular and part lamellar state. From the viewpoint of corrosion resistance, ease of acquisition, etc., the plating may be tin-free steel comprising a chromium oxide layer and a metal chromium layer or nickel plating comprising a nickel layer or a nickel layer and a nickel-iron alloy layer.

Note that the "main constituent component" means the component constituting 80 mass % of the plating composition or more, preferably 90 mass % or more, more preferably 95 mass % or more. If a plurality of elements form the main constituent component, for example, in the case of Ni—Sn plating etc., it is sufficient that the total of the component ratios of Ni and Sn be in the above-mentioned range.

The plating amount may be suitably selected according to the electrolyte of the battery, the use environment, etc. so that suitable corrosion resistance can be achieved and may be in the range of 0.1 g/m$^2$ to 135 g/m$^2$. If 5 mg/m$^2$ or less, the plating cannot be deposited over the entirety and the resistance to electrolyte adhesion easily declines. If 30 g/m$^2$ or more, cracks form in the plating during working and sometimes cause a reduction in peel strength etc. For this reason, preferably, the plating amount may be more than 5 mg/m$^2$ and may be less than 30 g/m$^2$.

Note that there are several possible types of plating baths for the plating, but the performance is exhibited irrespective of the plating bath. Further, besides electroplating, the plating method may be thermal spraying, vapor deposition, or hot-dip coating.

In one embodiment of the present invention, the shape of the plating welded part in a cross-section of the plated steel sheets after welding taken in the sheet thickness direction may have up-down symmetry with respect to the weld center line. More quantitatively, the shape of the plating welded part may be formed so that there is a ratio of 0.5 to 2.0 between the distance from the weld center line to the boundary of the plating welded part in a vertically upward direction and the distance from the weld center line to the boundary of the plating welded part in a vertically downward direction.

Here, the shape of the plating welded part having up-down symmetry with respect to the weld center line will be explained. Explaining the weld center line with reference to FIG. 4 (FIG. 5), on the left side of the drawings, there is a gap in which no weld is formed between two plated steel sheets which are vertically superposed. The straight line extending along the gap is called the "weld center line". As for the plating welded part, the end point of the gap lies at a location proceeding in the right direction along the gap (weld center line). This is one end of the plating welded part (plating weld starting point). The other end of the plating welded part (plating weld end point) is the boundary with the steel sheet welded part. Note that the boundary of the plating welded part is as explained above. The location of the plated steel sheet including the main constituent component of the plating in 60 mass % or more is judged to be the plating welded part. At each point from the plating weld starting point to the plating weld end point along the weld center line, it can be said that the shape of the plating welded part has up-down symmetry with respect to the weld center line if the distance from the weld center line to the boundary in the vertically upward direction and the distance from the weld center line to the boundary in the vertically downward direction are substantially equivalent. The upper and lower distances being substantially equivalent indicates the ratio between the upper and lower distances are in the range of 0.5 to 2.0. The closer the ratio is to 1.0, the higher the symmetry and the more preferable. For this reason, the ratio between the upper and lower distances may be in the range of 0.7 to 1.5. This shape can be easily obtained by edge joint welding. That is to say, with edge joint welding, inputting heat homogenously upward and downward from the weld center line is easy. Further, since the shape of the plating welded part has up-down symmetry, residual stress will tend to be homogenous vertically. This is useful in extending the life of the soundness of the plating welded part and in turn leads to longer term stability of the elution prevention effect.

Further, the plated steel sheet, particularly, the inner surface side of the battery case, can be surface treated to improve the electrolyte resistance. Various kinds of chromate treatment such as electrolytic chromate or resin chromate treatment or chromate-free conversion, for example, zirconium conversion, may be applied. Note that tin-free steel, which is already subjected to chromium-containing surface treatment as a product, has good electrolyte resistance equivalent to that of metal surfaces subjected to various kinds of chromate treatment. Conversion methods, to illustrate, include chromate treatment, chromate-free treatment not using $Cr^{+6}$, zirconium conversion, strike plating, epoxy primer treatment, silane coupling, titanium coupling, etc. Before conversion, descaling may be performed as a surface preparation treatment. Descaling methods include pickling, sandblasting, grit blasting, etc.

The shape and size of the battery case can be suitably selected according to usage etc. The battery case may have a prismatic shape, a cylindrical shape, etc. Note that in comparison to a cylindrical shape, the prismatic shape has excellent heat dissipation ability, therefore can be easily made in larger sizes, is more economical, and is also good in terms of stackability, so is preferable.

The shortest dimension of the battery case among height, width, and depth may be 10.0 mm or more. By making the shortest dimension 10.0 mm or more, the internal volume of the battery case can be made larger. For this reason, when the battery is modularized, the number of necessary batteries can be reduced, and module assembly is easy.

Further, for the electrolyte solution, a well-known electrolyte solution can be suitably selected according to the battery reaction. In the case of a lithium-based battery, a non-aqueous electrolyte is generally used. As a specific example of an electrolyte solution, one using a cyclic carbonate ester (ethylene carbonate: EC, propylene carbonate: PC), a chain carbonate ester (dimethyl carbonate: DMC, ethyl methyl carbonate: EMC, diethyl carbonate: DEC), or a solvent mixture of these and adding to that an electrolyte of lithium salt such as $LiPF_6$, $LiBF_4$, $LiClO_4$, etc. may be formed.

EXAMPLES

The present invention will be explained using the following examples. However, the present invention should not be interpreted to be limited to these examples.

A container body and a container lid formed from the material of each of the conditions shown in Table 1 were prepared. The outer edge parts of the container body and the container lid were superposed and welded by laser heating to fabricate a battery case. The outer dimensions of the battery case were 26.5×148.0×91.0 mm.

TABLE 1

| No. | Ex/Comp ex. | Container Sheet thickness (mm) | Plating type | Plating thickness (μm) | Welded part length (mm) | Lengh of plating welded part with 60% plating content or more (μm) | Length of plating welded part with 80% plating content or more (μm) |
|---|---|---|---|---|---|---|---|
| 1 | Ex. | 0.2 | Ni | 1 | 1.2 | 4 | 3.2 |
| 2 | Ex. | 0.3 | Ni | 2 | 2.2 | 7 | 5.8 |
| 3 | Ex. | 0.5 | Ni | 2 | 3.5 | 5 | 4.1 |
| 4 | Ex. | 0.3 | Ni | 3 | 2 | 8 | 6.5 |
| 5 | Ex. | 0.3 | Ni | 1 | 2.4 | 5 | 4.1 |
| 6 | Ex. | 0.3 | Ni | 0.5 | 1.8 | 5 | 3.3 |
| 7 | Ex. | 0.1 | Ni | 0.6 | 1 | 0.8 | 0.64 |
| 8 | Ex. | 0.8 | Al-Si | 15 | 5.2 | 38 | 25.3 |
| 9 | Ex. | 0.2 | Cr | 1 | 1.3 | 4 | 3.6 |
| 10 | Ex. | 0.2 | Ni-Sn | 2(1.9/0.1) | 1.1 | 6 | 4.8 |
| 11 | Ex. | 0.5 | Ni/Al-Si | 10 (0.5/9.5) | 3.1 | 26 | 19.2 |
| 12 | Ex. | 0.3 | Ni/Cr | 2(1.8/0.2) | 1.9 | 6 | 4.9 |
| 13 | Ex. | 0.3 | Cr/Ni | 2(0.2/1.8) | 1.8 | 7 | 5.5 |
| 14 | Ex. | 0.1 | Ni | 1 | 0.9 | 3 | 2.1 |
| 15 | Ex. | 1.0 | Ni | 6 | 6.2 | 11 | 8.2 |
| 16 | Ex. | 0.2 | Ni | 1 | 1.7 | 550 | 500 |
| 17 | Ex. | 0.2 | Ni | 0.5 | 1.6 | 960 | 890 |
| 18 | Comp. ex. | 0.2 | Ni | 0.4 | 1.6 | 0.3 | 0.28 |
| 19 | Ex. | 0.2 | Ni | 1 | 0.8 | 8 | 4.8 |
| 20 | Ex. | 0.2 | Ni | 1 | 0.8 | 380 | 230 |
| 21 | Comp. ex. | 0.2 | Ni | 0.5 | 1.1 | 0.4 | 0.2 |
| 22 | Comp. ex. | 0.1 | Ni | 0.5 | 0.8 | 0.4 | 0.29 |
| 23 | Comp. ex. | 0.3 | Ni | 10 | 2.4 | 0.3 | 0.27 |
| 24 | Comp. ex. | 0.4 | Ni | 2 | 2.9 | 0.4 | 0.35 |

| No. | Lid Sheet thickness (mm) | Plating type | Plating thickness (μm) | Foil Metal type | Width (mm) | Thickness (μm) | Cooling jig Used? | Welding method *Laser-based edge joint/lap *Seam | Evaluation Plating welded part up-down symmetry | Metal elution prevention effect |
|---|---|---|---|---|---|---|---|---|---|---|
| 1 | 0.2 | Ni | 1 | — | | | Yes | Edge | G | VG |
| 2 | 0.3 | Ni | 2 | — | | | Yes | Edge | G | VG |
| 3 | 0.5 | Ni | 2 | — | | | Yes | Edge | G | VG |

TABLE 1-continued

| | | | | | | | | | | |
|---|---|---|---|---|---|---|---|---|---|---|
| 4 | 0.3 | Ni | 3 | — | | | Yes | Edge | G | VG |
| 5 | 0.3 | Ni | 1 | — | | | Yes | Edge | G | VG |
| 6 | 0.15 | Ni | 0.5 | — | | | Yes | Edge | G | VG |
| 7 | 0.1 | Ni | 0.6 | — | | | Yes | Edge | G | VG |
| 8 | 0.8 | Al-Si | 15 | — | | | Yes | Edge | G | VG |
| 9 | 0.2 | Cr | 1 | — | | | Yes | Edge | G | VG |
| 10 | 0.2 | Ni-Sn | 2(1.9/0.1) | — | | | Yes | Edge | G | VG |
| 11 | 0.5 | Ni/Al-Si | 10 (0.5/9.5) | — | | | Yes | Edge | G | VG |
| 12 | 0.3 | Ni/Cr | 2(1.8/0.2) | — | | | Yes | Edge | G | VG |
| 13 | 0.3 | Cr/Ni | 2(0.2/1.8) | — | | | Yes | Edge | G | VG |
| 14 | 0.1 | Ni | 1 | — | | | Yes | Edge | G | VG |
| 15 | 1.0 | Ni | 6 | — | | | Yes | Edge | G | VG |
| 16 | 0.2 | Ni | 1 | Ni | 2 | 50 | Yes | Seam | G | VG |
| 17 | 0.2 | Ni | 0.5 | Ni | 2 | 50 | Yes | Edge | G | VG |
| *18* | *0.1* | *Ni* | *0.5* | *—* | | | *No* | *Edge* | *G* | *P* |
| 19 | 0.2 | Ni | 1 | — | | | Yes | Lap | B | G |
| 20 | 0.2 | Ni | 1 | Ni | 2 | 50 | Yes | Lap | G | VG |
| *21* | *0.1* | *Ni* | *0.5* | *—* | | | *No* | *Lap* | *P* | *P* |
| *22* | *0.1* | *Ni* | *0.5* | | | | *No* | *Edge* | *G* | *P* |
| *23* | *0.3* | *Ni* | *10* | | | | *No* | *Edge* | *G* | *P* |
| *24* | *0.4* | *Ni* | *2* | | | | *No* | *Edge* | *G* | *P* |

The conditions of the laser welding were suitably selected within the following ranges depending on the welded objects assuming use of a 1000 W semiconductor laser (HighLight 1000F made by Coherent Inc.)
  Wavelength: 800 to 1200 nm
  Focus size: 0.3 to 1.8 mm
  Assist gas: Ar 10 to 50 L/min, φ4 to 12 mm
  Laser output: 600 to 800 W
  Scanning speed: 10 to 40 mm/sec The conditions for seam welding were welding speed=6 m/min, current frequency 100 [Hz], welding current 4 kA, and applied pressure 0.6 N.

Further, in the examples (invention examples), cooling was performed with a jig in all of the welding methods so that a desired welding state was achieved. The cooling conditions were suitably adjusted depending on the desired welding state. More specifically, the range of cooling by the jig (length in the longitudinal direction of the welded part) was adjusted within the range of 2 to 5 mm according to the desired welded part length. Generally, the longer the range of cooling by the jig, the greater the volume of the jig and the greater the heat capacity and the longer the welded part length can be made.

Further, the container body and the container lid to be welded can be clamped by the jig to stably form the plating welded part at the time of welding. From this point as well, the jig length (length in the longitudinal direction of the welded part) was adjusted in the range of 2 to 5 mm so that a range of the desired length of the welded part or more can be clamped.

Further, the jig was kept at 100° C. or below in the pre-welding state to prevent variations in the cooling conditions. Note that a refrigerant may be circulated inside the jig so that the temperature of the jig does not become high.

Note that TFS having a thickness of 0.1 to 1.0 mm was used as the base material of the plated steel sheet.

Further, as a plating condition, Cr plating was applied by Cr electrolytic plating. The Cr plating bath used a Sargent bath including 250 g/L of chromic acid and 3 g/L of sulfuric acid. As electrolysis conditions, a plating bath temperature of 50° C. and a current density of 30 A/dm$^2$ were used.

A Ni plating was applied by Ni electrolytic plating. The Ni plating bath used a strike bath including 240 g/L of nickel chloride and 125 ml/L of hydrochloric acid. As electrolysis conditions, a pH of −1.0 to 1.5, a plating bath temperature of 25° C., and a current density of −4 A/dm$^2$ were used.

A Sn plating was applied by Sn electrolytic plating. The Sn plating bath used a bath including 36 g/L of SnSO$_4$ and 115 g/L of p-phenolsulfonic acid. As electrolysis conditions, a pH of 1.0 to 1.5, a plating temperature of 25° C., and a current density of 4 A/dm$^2$ were used. As electrolysis conditions, a plating bath temperature of 45° C. and a current density of 30 A/dm$^2$ were used.

An Al plating was applied by hot dip coating in an Al bath including 9 mass % Si and a plating bath temperature of 680° C.

Each obtained battery case was evaluated for metal elution prevention. The results are described in Table 1. The contents of the evaluation are as follows.

(Up-Down Symmetry of Plating Welded Part)

The up-down symmetry of the shape of each plating welded part was evaluated. Specifically, for the shape of the plating welded part, the distance from the weld center line to the boundary of the plating welded part in the vertically upward direction and the distance from the weld center line to the boundary of the plating welded part in the vertically downward direction were measured. A plating welded part in which the upper and lower distances were substantially equivalent, that is, the ratio between the upper and lower distances was in the range of 0.5 to 2.0, was evaluated as "G" (good), while one out of the range was evaluated as "P" (Poor).

Note that observation and measurement of the plating welded parts and steel sheet welded parts were performed with an SEM-EDS (JEOL JSM-7000F). The SEM captured an image at 2000 times magnification. The EDS was JEOL JED-2300 and performed linear analysis at a beam interval of 1 μm under a current voltage of 120 μA and a voltage of 15 kV. The vacuum at the time of measurement was 9.6× 10$^{-5}$ Pa or less.

(Metal Elution Prevention)

Similar to a sealing test, a lid and a container were welded and a hole was punctured in the bottom surface. A solution of an electrolyte solution (1.0 M LiPF$_6$ in EC/DMC=50/50 (v/v)) degraded in 1000 ppm of water to cause corrosion to progress more readily was introduced through the hole. The solution was filled in the container after repeated rinsing of the inside with the electrolyte solution as necessary in order to prevent metal powder produced by puncturing the hole in the bottom surface from remaining inside the container.

The container was turned upside down so that the welded part and the surroundings were immersed in the solution.

Kapton tape and an aluminum seal were applied as double sealing over the hole (liquid inlet) of the container, then the container was stored for one month at 50° C. Afterwards, the solution inside the container was collected from the injection opening with a pipette etc. The solution was examined by ICP, where an evaluation of "VG" (Very Good) was made if the Fe component in the solution was 15 ppm or lower, "G" (Good) if more than 15 ppm but 50 ppm or less, and "P" (Poor) if more than 50 ppm.

No. 18 and Nos. 21 to 24 did not use cooling jigs, so the lengths of the plating welded parts were less than 0.5 μm, chemical reactions between the electrolyte solution and the steel sheet base materials could not be sufficiently prevented, the metal (iron) of the base materials eluted into the electrolyte, and therefore the metal elution prevention was "P" (Poor). In the invention examples, the length of the plating welded part was 0.5 μm or greater, and metal elution prevention was "VG" (Very Good) or "G" (Good).

Note that it is thought that the reason why the elution prevention for No. 19 was "G" (Good) was because the shape of the plating welded part did not have up-down symmetry.

The invention claimed is:

1. A battery case comprising a container body and a container lid, in which battery case,
   the container body and the container lid are each comprised of a plated steel sheet,
   a joint part between the container body and the container lid is comprised of a plating welded part containing a main constituent component of the plating of the plated steel sheet in 60 mass % or more and a steel sheet welded part containing the main constituent component of the plating in less than 60 mass %, and the plating welded part has a length of 0.5 μm or more and less than 1.00 mm in a joint longitudinal direction,
   the plating welded part is a portion which is able to contact an electrolyte solution inside the battery case,
   the steel sheet welded part is a portion adjacent to the plating welded part on an opposite side from the inside of the battery case, contact with the electrolyte solution is prevented by the plating welded part, and
   the main constituent component of the plating is a component constituting 80 mass % or more of the composition of the plating.

2. The battery case according to claim 1, wherein a boiling point of the main constituent component of the plating is the melting point of the base material of the plated steel sheet or more and a melting point of the main constituent component of the plating is the melting point of the base material or less.

3. The battery case according to claim 1, wherein the plated steel sheet has a sheet thickness of 0.1 or more and 1.0 mm or less.

4. The battery case according to claim 1, wherein the plated steel sheet has a plating thickness of 0.5 or more and 15.0 μm or less.

5. The battery case according to claim 1, wherein a concentration of the main constituent component of the plating is higher at the center of the plating welded part than at the plating surface of the plated steel sheet.

6. The battery case according to claim 1, wherein the base material of the plated steel sheet is steel sheet, and the main constituent component of the plating includes one or more of Ni, Al, Sn, and Cr.

7. The battery case according to claim 1, wherein, in a cross-section of the plated steel sheet in a sheet thickness direction, the plating welded part has a shape in which a ratio between the distance from a weld center line to a boundary of the plating welded part in a vertically upward direction and the distance from the weld center line to a boundary of the plating welded part in a vertically downward direction is within 0.5 to 2.0.

8. The battery case according to claim 2, wherein the plated steel sheet has a sheet thickness of 0.1 or more and 1.0 mm or less.

9. The battery case according to of claim 2, wherein the plated steel sheet has a plating thickness of 0.5 or more and 15.0 μm or less.

10. The battery case according to claim 2, wherein a concentration of the main constituent component of the plating is higher at the center of the plating welded part than at the plating surface of the plated steel sheet.

11. The battery case according to claim 2, wherein the base material of the plated steel sheet is steel sheet, and the main constituent component of the plating includes one or more of Ni, Al, Sn, and Cr.

12. The battery case according to claim 2, wherein, in a cross-section of the plated steel sheet in a sheet thickness direction, the plating welded part has a shape in which a ratio between the distance from a weld center line to a boundary of the plating welded part in a vertically upward direction and the distance from the weld center line to a boundary of the plating welded part in a vertically downward direction is within 0.5 to 2.0.

13. The battery case according to of claim 3, wherein the plated steel sheet has a plating thickness of 0.5 or more and 15.0 μm or less.

14. The battery case according to claim 3, wherein a concentration of the main constituent component of the plating is higher at the center of the plating welded part than at the plating surface of the plated steel sheet.

15. The battery case according to claim 3, wherein the base material of the plated steel sheet is steel sheet, and the main constituent component of the plating includes one or more of Ni, Al, Sn, and Cr.

16. The battery case according to claim 3, wherein, in a cross-section of the plated steel sheet in a sheet thickness direction, the plating welded part has a shape in which a ratio between the distance from a weld center line to a boundary of the plating welded part in a vertically upward direction and the distance from the weld center line to a boundary of the plating welded part in a vertically downward direction is within 0.5 to 2.0.

17. The battery case according to claim 4, wherein a concentration of the main constituent component of the plating is higher at the center of the plating welded part than at the plating surface of the plated steel sheet.

18. The battery case according to claim 4, wherein the base material of the plated steel sheet is steel sheet, and the main constituent component of the plating includes one or more of Ni, Al, Sn, and Cr.

19. The battery case according to claim 4, wherein, in a cross-section of the plated steel sheet in a sheet thickness direction, the plating welded part has a shape in which a ratio between the distance from a weld center line to a boundary of the plating welded part in a vertically upward direction and the distance from the weld center line to a boundary of the plating welded part in a vertically downward direction is within 0.5 to 2.0.

20. The battery case according to claim 5, wherein the base material of the plated steel sheet is steel sheet, and the main constituent component of the plating includes one or more of Ni, Al, Sn, and Cr.

* * * * *